Feb. 19, 1929.
E. E. VON BERGEN
1,702,712
PISTON AND VALVE ARRANGEMENT FOR AIR BRAKES
Filed April 12, 1928
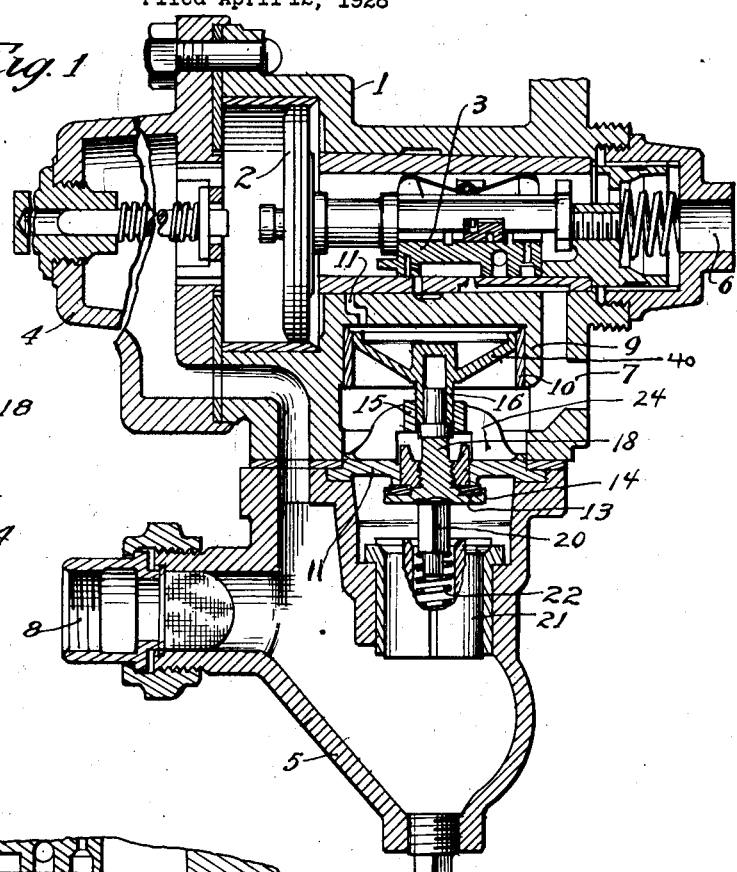
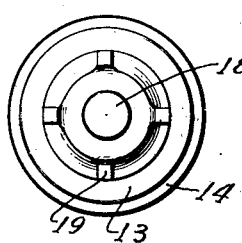
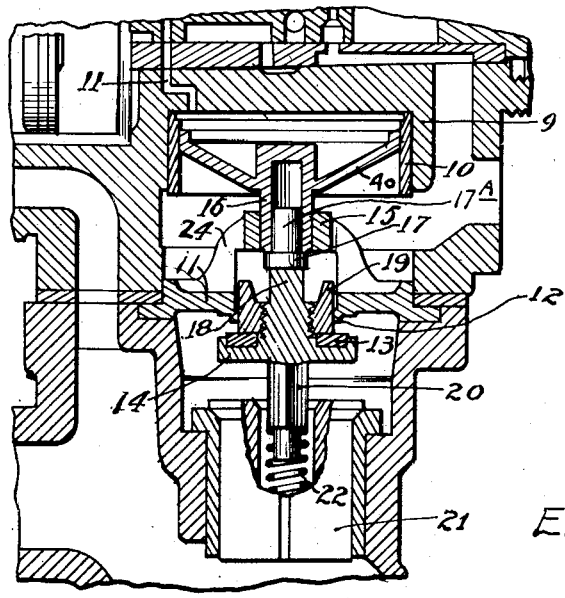
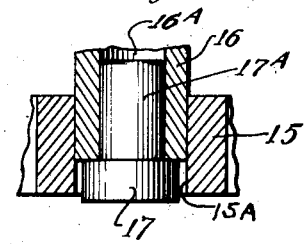
Inventor:
Emil E. Von Bergen
by Albert Scheith
Attorney Patented Feb. 19, 1929.

1,702,712

UNITED STATES PATENT OFFICE.

EMIL E. VON BERGEN, OF CHICAGO, ILLINOIS.

PISTON AND VALVE ARRANGEMENT FOR AIR BRAKES.

Application filed April 12, 1928. Serial No. 269,493.

My invention relates in its general aspects to valves of the general class in which a piston coaxial with two relatively reversed and movable valve members is moved by fluid pressure for opening the nearer valve member, and in which a spring reacting between the two valve members continually tends to retract the piston and to seat both of the movable valve members.

In such valve constructions, it has heretofore been customary to provide the said nearer movable valve member with a stem slidably guided by the farther valve member, and also with a stem which telescopically fits a tubular stem on the piston, the depth of the bore in the tubular piston stem being such that the bottom of this bore will engage the end of the valve stem which fits the said bore. Thus arranged, the piston stem and the farther valve member jointly guide the interposed (nearer) valve member, and the various parts need to be accurately alined to insure a dependable operation.

In practice, the two oppositely directed stems on the said nearer valve member frequently are bent out of alinement, thereby causing one or both stems to bind on the parts which guide them, and also tilting that valve member so that it will no longer seat tightly. Moreover, the slamming of the bottom of the bore in the piston stem against the tip of the valve stem which slides in that bore tends to loosen the nut which clamps the usual compressible facing to the corresponding valve head, thereby leading to leakage.

My present invention aims to overcome all of these objections, and also to provide a valve construction of greater durability, and one particularly suited for the emergency valves which form important portions of the air brake equipment commonly employed on railway cars.

This triple valve mechanism responds to suitable increases or decreases in the brake pipe pressure for connecting the brake pipe to the auxiliary reservoir to charge the latter, for connecting this reservoir with the brake cylinder so as to apply the brake, and for connecting the brake cylinder with the outer air to permit the escaping of the air to release the brakes. In practice, the safe operation of a car equipped with brakes controlled by such a triple valve depends on the maintaining of an adequate air pressure in the brake pipe, and this safety would be vitiated if the brake pipe broke so as to annul this pressure.

To safeguard the car or train in case of such an accident, it is customary to include a socalled emergency valve with the above described tripple valve mechanism, namely a valve which will automatically connect the brake pipe with the brake cylinder in case the pressure in the brake pipe suddenly drops. For this purpose, the emergency valve includes an emergency piston disposed in a cylinder and subjected to pressure from air in the auxiliary reservoir when the main piston is moved by this reservoir pressure in response to a sudden drop of the pressure in the brake pipe, and a movable valve connected to this emergency piston for controlling an emergency connection between the brake pipe and the brake cylinder.

In the mechanisms heretofore employed, the movable valve controlled by this piston has two integral stems projecting in opposite directions, one stem being guided by a stationary guide in the valve casing while the other stem is slidably guided in a tubular stem on the emergency piston, which piston in turn is guided by the bore of the cylinder in which it moves.

Consequently, the effective functioning of the emergency valve depends on high accuracy in the alining of the emergency piston (and of its tubular stem) with the stationary guide.

In practice, these portions are not always machined with the desired accuracy, one of the stems on the emergency valve may not be machined in exact alinement with the other stem, rough handling may annul an initially exact alining of the two stems, or there may be a slightly tilted facing of the casing parts which respectively include the cylinder for the emergency piston and the mounting for the said stationary guide.

As the result of such occurrences, it is quite common for such an emergency valve to stick (either by having the piston bind in its cylinder, or by having one or both stems bind in their guides), thereby interfering with the prompt and effective functioning of the emergency valve. It is likewise quite common to have the valve member of the emergency valve tilt with respect to its seat, thereby permitting air from the brake pipe to enter the brake cylinder along with the normally admitted air for the latter, thus building up an excessive pressure in this cylinder and keeping the brakes stuck. Moreover, any such tilting of the emergency valve, even if not serious initially, will cause uneven wear on the rubber valve facing, thus leading to leakage.

A further source of trouble and replacement expense with the previously employed emergency valve construction is found in the clamping of the usual rubber washer or gasket to the valve by a nut threaded upon the stem of the valve, which nut is laterally free and is apt to be jarred loose by the sudden slamming of the piston against the tip of the stem of the emergency valve.

Generally speaking, my invention aims to provide a simple, inexpensive and durable emergency valve and valve guide arrangement which will overcome all of the above named objections. More particularly, my invention provides a construction for this purpose in which the movable emergency valve member consists of two separate parts respectively provided with the piston and the valve head, and in providing guide means for one of these parts to permit a relative tilting and lateral shifting of the two parts, thereby avoiding both a sticking of the valve and a leakage of air at the valve seat. Furthermore, my invention provides a construction in which a spider-shaped nut serves both as a long guide for one end of the part provided with the valve head and as a means for clamping the packing washer to this head, and in which this guide will permit a tilting of the valve head.

Still further and also more detailed objects will appear from the following specification and the accompanying drawings, in which Fig. 1 is a central section, taken longitudinally of the main and emergency pistons, through a triple air brake valve embodying my invention and showing the emergency valve closed.

Fig. 2 is an enlargement of a portion of Fig. 1, showing the emergency valve in its opened position and with both parts of the removable valve member in central section.

Fig. 3 is an elevation of the movable emergency valve member.

Fig. 4 is an enlarged central and vertical section through the lower portion of the stem of the emergency valve piston and the adjacent guide for this stem.

In the illustrated embodiment, the body of the valve includes an upper body portion 1 in which the main piston 2 is slidably mounted for horizontal movement, a front cap 4, and a bottom shell 5. The upper body portion 1 has a connection 6 leading to the usual auxiliary reservoir, and a connection 7 leading to the brake cylinder, while the bottom shell has a connection 8 to the brake pipe.

The upper or main body portion 1 also includes a horizontal and downwardly open cylinder 9 having a tubular lining 10 in which the emergency valve piston slides, and has a port 11 controlling the admission of compressed air to the cylinder 9 for forcing the emergency valve piston downwardly. This port is controlled in the usual manner by a slide valve 3 which is actuated by the main piston 2 and which slide valve admits air to the emergency cylinder 9 when the main piston is moved forward to the position shown in Fig. 2.

Rigidly mounted in the valve body is a guide member 11 which has a downwardly directed annular seat 12 normally engaged by the packing ring portion 13 of the valve head 14 of the movable valve member of the emergency valve. The guide member 11 also has upwardly directed arms 24 supporting a tubular guide 15 slidably fitting the stem 16 of the emergency piston 40, and this stem has its lower end 17 in engagement with the upper end of the upper stem 18 of the movable member of the emergency valve.

This movable member also has a guide portion 19 extending upwardly from its head. The lower part of this guide portion slidably fits the bore of the annular valve seat 13, while the upper part is contracted to a smaller diameter and recessed to afford passages through which air can readily flow when this movable member of the emergency valve is depressed (as in Fig. 2) to open the emergency valve, for which purpose I preferably form the said upper part 19 into spaced fingers.

The movable emergency valve member also has a downwardly projecting stem 20 which extends into a cup shaped guide 21 supported by the bottom shell 5 of the valve body, and a compression spring 22 interposed between the stem 20 and the guide 21 continuously urges the said movable valve member upwardly towards its closure position. However, the stem 20 has its lower portion smaller in diameter than the bore of the cup shaped guide 21, so that this stem can move laterally or tilt with respect to that bore, such movements being permitted by the flexibility of the spring 22.

With the parts thus arranged, an approximate axial alining of the emergency piston cylinder 9 with the bore 15$^A$ of the guide 15 will insure a free guiding of the piston 40 and its stem 16, and if desired this stem may loosely fit the bore of the guide 15. Since the entire movable member of the emergency valve is separately guided, no bending or binding can be caused by a lack of axial alinement between the upper and lower stems (18 and 20) of this member with each other, or with the piston of the emergency valve.

Moreover, the guide portion 19 of the movable member of the emergency valve does not need to fit the bore of the valve seat 12, but can have sufficient clearance so that the stem of this movable member can shift laterally or tilt with respect to the stem 16 of the piston, thereby permitting the emergency valve to close tightly even if the packing member 13 wears irregularly or is compressed more on one side than on the opposite one.

To facilitate the mounting and replacing of this packing washer 13 I preferably employ the guide portion 19 as a nut threaded on the upper stem 18 and clamping the washer against the head 14 of the emergency valve.

To increase the durability of the interengaging stems, I also provide one of these (and desirably the piston stem 16) with a separately manufactured lower end part comprising a shank 17$^A$ driven to a tight fit into an axial bore 16$^A$ in the piston stem 14 and a lower head 17 underhanging the bottom of this stem, this head 17 being smaller in diameter than the bore 15$^A$ of the guide 15. This separately manufactured part is preferably of steel or other tough metal, and by making its head 17 smaller in its initial diameter than the bore 15$^A$ of the guide (into which bore this head normally extends), I prevent a diametric expanding of the head 17 from causing that head to bind in the bore of the guide when the emergency valve is closed.

With the valve mechanism thus arranged, I secure these important advantages:

(1) The entire emergency valve member (including the movable valve head 14 with its stems 18 and 20, and with the facing 13 clamped to it by the combined nut and guide 19) is free to shift or tilt with respect to the piston 10 and its tubular stem 16, and the laterally yieldable guiding of the lower stem 20 by the spring 22 permits such relative movement. Consequently, I do not require an accurate axial alining of the bore of the piston with the two valve stems and the check valve 21, as neither a lack of such accurate alinement nor a bending of the valve stems, nor an inaccurate machining of these stems will cause any parts to stick or bind.

(2) The piston 10 plays no part in guiding the emergency valve and hence cannot be cramped by any tilting of the latter.

(3) The spring 22 forms a laterally yieldable and tiltable connection between the lower valve stem 20 and the check valve 21 to compensate for any lack of alinement between these parts.

(4) The lower end of the piston stem (here shown as formed by the head 17 of an inserted part) continuously abuts against the end of the upper valve stem 18, so that there is no slamming of these parts against each other during the operation of the valve.

(5) The guide 15 (here shown as supported by spider arms 24) serves only to guide the piston stem and clears the upper valve stem 18 at all times.

(6) The tapering of the fingers on the nut 19, which nut tapers upwardly from a bottom diameter slightly smaller than the bore of the valve seat 12, permits the tilting of the emergency valve with respect to this seat, thus insuring a tight seal even if the facing 13 compresses unsymmetrically. This reduced size of the nut also prevents either dirt, moisture or shrinkage in cold weather from causing the nut to stick in the bore of the emergency valve seat.

However, while I have illustrated and described my invention in an embodiment particularly suited for use as part of an air brake mechanism, I do not wish to be limited to its employment for that purpose. Neither do I wish to be limited to the details of the construction and arrangement thus disclosed, since changes might obviously be made without departing either from the spirit of my invention or from the appended claims.

I claim as my invention:

1. In a valve, a cylinder, two annular valve seats consecutively and fixedly spaced from the cylinder and substantially coaxial with the cylinder; a piston slidable in the cylinder and having a stem extending toward the nearer valve seat; a movable valve member including a head portion disposed between the two valve seats and adapted to seat on the nearer valve seat, and also including two stems coaxial with the head portion and extending in opposite directions from the latter, one of the said valve member stems abutting endwise against the end of the said piston stem; a check valve disposed between the two valve seats and adapted to seat on the valve seat which is furthest from the cylinder, and spring means interposed between the check valve and the other stem of the said movable valve member and continually tending to seat both the check valve and the head portion of the said valve member.

2. A valve construction as per claim 1, in which the spring means comprise a spring freely housed by the check valve and arranged to permit relative tilting and laterally shifting of the axis of the movable valve member with respect to the axis of the said cylinder.

3. A valve construction as per claim 1, including a stem guide fast with respect to the said nearer valve seat and slidably guiding the piston stem, the said guide being disposed so that the piston stem extends entirely through it in all operative positions of the piston.

4. A valve construction as per claim 1, including a stem guide fast with respect to the said nearer valve seat and slidably guiding the piston stem, the piston stem having a hardened end portion of smaller diameter than the bore of the stem guide.

5. A valve construction as per claim 1, in which the movable valve member includes a pilot portion extending through the bore of the said nearer valve seat from the said head portion toward the said cylinder and tapering toward the cylinder, and an annular facing clamped between the said head and pilot portions and disposed for engaging the said nearer valve seat.

6. A valve construction as per claim 1, in which the movable valve member includes a pilot portion extending through the bore of the said nearer valve seat from the said head portion toward the said cylinder and tapering toward the cylinder, and an annular facing clamped between the said head and pilot portions and disposed for engaging the said nearer valve seat, the pilot portion including circumferentially spaced fingers disposed for engaging the bore of the said nearer valve seat and having radially outward recesses between the consecutive fingers.

7. An air brake valve as per claim 1, in which one of the said abutting stem ends has an inserted tip portion of harder metal than that of the stem end engaged by it.

8. An air brake valve as per claim 1, in which the movable valve member includes an annular facing engaging a face of the head and disposed for engaging the said side of the seat, the said pilot portion being threaded upon the stem of this valve member and serving to clamp the facing against the head.

9. An air brake valve as per claim 1, in which the spring means are arranged to permit transverse movement of the said valve member with respect to the axis of the secondary piston.

10. In a triple air brake valve, a main piston, an emergency piston controlled by movements of the main piston, stationary guiding means for the emergency piston; a brake pipe check valve arranged to open toward the emergency piston; an emergency check valve reversely seated relatively to the brake pipe check valve and in simple thrust relation with the emergency piston; guiding means carried by the last named valve; and a spring reacting between said valves and urging both to their seats.

11. In a triple valve, a main piston, an emergency cylinder, means controlled by the main piston for admitting fluid to the emergency cylinder, an emergency piston slidable in the said cylinder and having a tubular stem, a fixed guide for said stem; a thrust member fixed in the bore of said stem and presenting a head beyond the end of the stem, the head being arranged to clear said guide; a brake pipe check valve arranged to open toward the emergency piston; an emergency check valve reversely seated relatively to the brake pipe check valve, and in simple thrust relation with said thrust member; a guiding spider fast with respect to the seat of the emergency valve, and a spring reacting between said valves and urging both to their seats.

12. In an air-brake valve of the class in which the normal movements of a main piston control the needed air connections under normal operating conditions; a secondary cylinder, means controlled by an excessive movement of the main piston in one direction for admitting air to the secondary cylinder; a secondary piston slidably fitting the secondary cylinder and having a projecting stem, an annular valve seat beyond the free end of the said stem and in axial alinement with the stem; a movable valve member having a pilot portion normally extending through the bore of the valve seat and having a head normally engaging the side of the seat which is directed away from the secondary piston, and also having a stem extending toward and in endwise abutting relation to the stem of the secondary piston; and spring means continuously urging the valve head toward the said seat.

13. In an air-brake valve of the class in which the normal movements of a main piston control the needed air connections under normal operating conditions; a secondary cylinder, means controlled by an excessive movement of the main piston in one direction for admitting air to the secondary cylinder; a secondary piston slidably fitting the secondary cylinder and having a projecting stem, an annular valve seat beyond the free end of the said stem, and in axial alinement with the stem; a movable valve member having a pilot portion normally extending through the bore of the valve seat and having a head normally engaging the side of the seat which is directed away from the secondary piston, and also having a stem extending toward and in endwise abutting relation to the stem of the secondary piston; the movable valve member having a second stem extending in the opposite direction from its aforesaid stem; in combination with a check valve in substantially axial alinement with the secondary cylinder and the annular valve seat, and a compression spring interposed between the said second stem and the check valve.

Signed at Chicago, Illinois, April 9th, 1928.

EMIL E. VON BERGEN.